United States Patent [19]

Watanabe

[11] Patent Number: 5,059,879
[45] Date of Patent: Oct. 22, 1991

[54] ELECTRIC ACTUATOR CONTROL APPARATUS

[75] Inventor: Susumu Watanabe, Tokyo, Japan

[73] Assignee: Nippon Gear Co., Ltd., Fujisawa, Japan

[21] Appl. No.: 369,958

[22] Filed: Jun. 22, 1989

[30] Foreign Application Priority Data

Jun. 28, 1988 [JP] Japan .................. 63-84537[U]

[51] Int. Cl.⁵ .................................... H02K 17/34
[52] U.S. Cl. ................... 318/603; 318/601; 318/434; 318/286
[58] Field of Search ............... 318/430–434, 318/560–638, 282–286

[56] References Cited

U.S. PATENT DOCUMENTS

| | | | |
|---|---|---|---|
| 3,757,131 | 9/1973 | Krutz et al. | 307/66 X |
| 3,940,675 | 2/1976 | Schroeder | 318/603 |
| 3,997,826 | 12/1976 | Mayer | 318/286 X |
| 4,084,120 | 4/1978 | Lund | 318/599 |
| 4,097,786 | 6/1978 | Lund | 318/282 |
| 4,126,818 | 11/1978 | Taylor | 318/48 X |
| 4,131,838 | 12/1978 | Etoh et al. | 318/603 |
| 4,147,966 | 4/1979 | Kain et al. | 318/601 X |
| 4,193,019 | 3/1980 | Killian | 318/603 X |
| 4,305,029 | 12/1981 | Takahashi | 318/603 |
| 4,360,769 | 11/1982 | Selkey et al. | 318/603 X |
| 4,364,111 | 12/1982 | Jocz | 318/466 X |
| 4,445,075 | 4/1984 | Fry | 318/434 |
| 4,491,775 | 1/1985 | Harvey et al. | 318/434 |
| 4,510,424 | 4/1985 | Doniwa | 318/434 X |
| 4,547,844 | 10/1985 | Adams | 318/569 X |
| 4,575,666 | 3/1986 | Nakashima et al. | 318/602 X |
| 4,591,772 | 5/1986 | Hollow | 318/48 X |
| 4,647,827 | 3/1987 | Toyoda et al. | 318/594 X |
| 4,657,447 | 4/1987 | Faulstich et al. | 364/474.02 X |
| 4,719,396 | 1/1988 | Shimizu | 318/432 |
| 4,827,203 | 5/1989 | Sakano | 318/601 |

OTHER PUBLICATIONS

*Limitorque*, Valve Controls, Bulletin 871, Copyright 1971, Limitorque Corporation, pp. 1–18.

*Primary Examiner*—Paul Ip
*Attorney, Agent, or Firm*—Zarley, McKee, Thomte, Voorhees & Sease

[57] ABSTRACT

When abnormal torque occurs in a valve, water gate, etc., it changes speed of a load shaft in a reduction gears, which is transmitted from a worm to a rotary encoder via a main shaft connected to an electric motor and gears. An electric signal is fed from the rotary encoder to a microcomputer in which the abnormal torque is identified to stop the elctric motor. The microcomputer also identifies a full-opening point and a complete-closing point of the valve to stop the electric motor.

8 Claims, 3 Drawing Sheets

ELECTRIC ACTUATOR CONTROL APPARATUS

BACKGROUND OF THE INVENTION

The present invention relates to an electric actuator control apparatus or a reciprocative drive apparatus having an electric motor for opening or closing a valve at a plant or a water gate in electric power facilities with the electric motor.

When foreign substances are caught in opening-closing part of a valve or a water gate to increase load torque abnormally, an electric actuator detects abnormal increase in torque to stop the motor automatically.

FIG. 5 illustrates an example of a known electric actuator control apparatus in which an electric motor "A" reciprocates a load shaft "C" in an axial direction via a worm gear "B". By spline engagement, a worm "D" in the worm gear "B" does not rotate around a main shaft "E" which rotates via a gear by the electric motor "A", but moves in an axial direction. At the center of a worm wheel "F" which engages with the worm "D", is fixed a nut "G" which engages with a thread formed around the load shaft "C", and by rotating the worm wheel "F", the nut "G" actuates the load shaft "C". There are provided compression springs "$H_1$" and "$H_2$" between each end of the worm "D" and proper fixed members "I", whereby the worm "D" moves axially with thrust against the compression springs "$H_1$" and "$H_2$".

The rotation of the main shaft "E" is transmitted via gears "$J_1$" and "$J_2$" to a drive gear "L" of gear counters "$K_1$" and "$K_2$", which counts how many times the main shaft "E" rotates. The gear counters "$K_1$" and "$K_2$" comprises switches "$M_1$" and "$M_2$" which turns "ON" or "OFF" with respect to a preset counting value. If the load shaft "C" is of a valve, the switches "$M_1$" and "$M_2$" turn "ON" or "OFF" at a full-opening position and complete-closing position of the valve respectively. The gear counters "$K_1$" and "$K_2$" are adjusted to allow the switches "$M_1$" and "$M_2$" to be "ON" or "OFF" at full-opening and complete-closing positions respectively, the adjustment being made actually at full-opening or complete-closing situations of the valve.

Also, when a control signal is required to generate t an intermediate opening position, an intermediate gear counter (not shown) similar to the gear counter "$K_1$" and "$K_2$" may be connected with the drive gear "L". The valve is set to take a certain intermediate opening degree at which the intermediate gear counter is actually adjusted such that the switch turns "ON" or "OFF". At one end of the worm "D", there is provided an annular groove "N", which engages with a lever "O" rotatably secured to a proper fixed member. The lever "O" is connected to switches "$P_1$" and "$P_2$" which turns "ON" or "OFF" depending on a rotational angle.

The switch "$P_1$" turns "ON" or "OFF" when the electric motor "A" rotates in a forward direction (for example, the worm "D" is rotated in an opening direction of the valve) to produce resistance on the load shaft "C" so that the worm "D" moves axially to reach to a certain distance. The switch "$P_2$" detects movement of the worm "D" and turns "ON" or "OFF" when the electric motor "A" reverses. Since axial movement of the worm "D" is proportional to load torque, the switches "$P_1$" and "$P_2$" also work depending on load torque. The switches "$M_1$", "$M_2$", "$P_1$" and "$P_2$" control an electromagnetic switch "R" which connected to a power source "Q" for the electric motor "A". The switches "M" and "$M_2$" stop the electric motor "A" when the valve opens or is closed completely, while the switches "P" and "$P_2$" stop it when abnormal torque generates during opening or closing of the valve.

Opening degree of the valve is displayed by rotating a pointer "S" in an opening-degree indicator "T" depending on rotation of the main shaft "E". The opening degree is transmitted to a central supervision system via an angle signal generator "U" which converts rotational angle of the pointer "S" to an electric signal.

The known electric actuator for opening and closing a valve, a water gate, etc. requires operation at full-opening and complete-closing points of a valve and at maximum limit of abnormal load torque, but, to detect the operation points, a complicate structure as above is required, so that the number of parts increases. When an intermediate opening degree of a valve, etc. requires an operation point, one gear counter is required for one operation point, so that there are problems about connection of the gear counter with a main shaft and a storage space. Further, driven material such as a valve and a water gate operated by an electric actuator has different rotational angle of the rotation lever "O", the angle corresponding to operation stroke and load torque being variable depending on types and how to open and close a valve etc., and even the same product involves errors in each stroke and rotation angle, so that each operation point requires to be adjusted actually, which is troublesome and complicate.

The structure for detecting operation points is likely to result in a timing error due to wear at connection of gears, a lever, etc., and wear is different depending on frequency of reciprocating. So, in a plant where a number of electric actuators are used, terms for maintenance, inspection and part replacement are different in each actuator to involve troublesome work.

The switches "$M_1$", "$M_2$", "$P_1$" and "$P_2$" are integrally connected to the gear counters "$K_1$" and "$K_2$", the rotation lever "O", etc., so that it is necessary to replace the whole control structure when contact points of each switch "$M_1$", "$M_2$", "$P_1$" and "$P_2$" are subject to wear and it is also necessary to adjust operation points when replaced. However, it is very difficult to operate a valve experimentally at full-opening and complete-closing positions while the plant is in operation. And it is impossible to adjust it by actual fitting.

SUMMARY OF THE INVENTION

An object of the present invention is, therefore, to provide an electric actuator which overcomes the above disadvantages.

The present invention provides a control apparatus in an electric actuator for operating driven material with output of an electric motor, comprising rotation detecting means for detecting an input rotation amount of reduction means digitally at absolute level with respect to a certain reference position, the detecting means being connected to an input rotation shaft of the reduction means, load torque control means for detecting load torque with rate of change of the detected input rotation amount and identifying magnitude of the detected load torque with a certain value to control the electric motor so that the load torque controls operation and means for measuring operation points of the material at absolute level of the input rotation amount of the reduction means to identify detected input rotation amount and to control the electric motor thereby, so that the operation is made at the operation position of the material.

BRIEF DESCRIPTION OF DRAWINGS

These and other objects, features and advantages of the invention will become more apparent from the following description in connection with the accompanying drawings, in which.

PREFERRED EMBODIMENTS OF THE INVENTION

Figure 1:
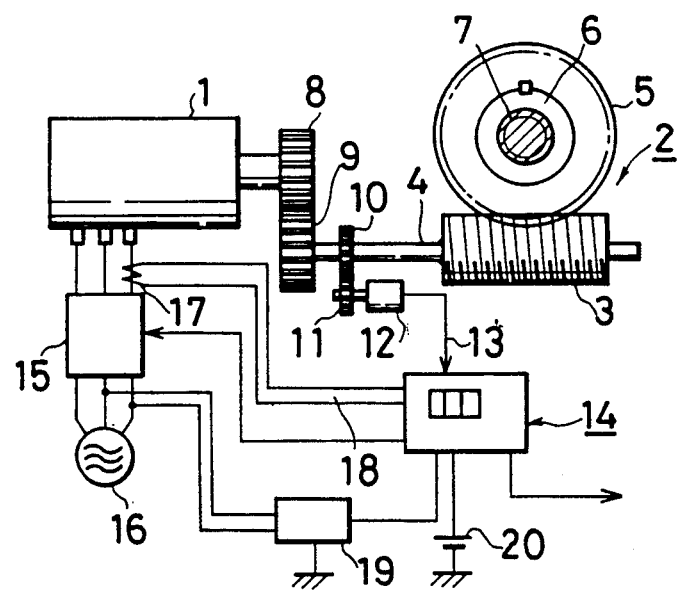
FIG. 1 is a schematic view which illustrates one embodiment of an electric actuator control apparatus according to the present invention.

FIG. 1 illustrates one embodiment of the present invention. Reference numeral 1 designates an electric motor, 2 designates a reduction means which comprises worm gears, 3 designates a worm, 4 designates a main shaft, 5 designates a worm wheel, 6 designates a nut and 7 designates a load shaft. The worm 3 is fixed to the main shaft 4, which rotates via gears 8 and 9 by the electric motor 1. The nut 6 is fixed to the worm wheel 5 and engages with a male screw formed around the load shaft 7. So, the load shaft 7 reciprocates in an axial direction depending on rotation of the worm wheel 5.

A rotary encoder 12 is connected via gears 10 and 11 to the main shaft 4 and generates an output electric signal 13 depending on rotation of the main shaft 4. There are two types of the rotary encoder 12, absolute and incremental types, and either of the types may be employed in this invention.

When the rotary encoder 12 is of absolute type, the output electric signal 13 generates as digital value which indicates how many times the main shaft 4 rotates in a forward or reverse direction from a preset reference position. When the rotary encoder 12 is of incremental type, the output electric signal 13 generates as a pulse for a certain rotation angle depending on rotation of the main shaft 4. The output electric signal 13 from the rotary encoder 12 is fed to an operation control device 14.

The electric motor 1 is connected to a three phase AC power source 16 via power applying interrupting means 15, an electric current from the electric motor 1 being detected by a current detector 17 which is connected to one phase of three phase alternating currents. An output signal 18 from the current detector 17 is fed to the operation control device 14.

The power applying-interrupting means 15 can be switched to rotate the electric motor 1 in a forward or reverse direction and comprises an electromagnetic switch or a contact switch which comprises a thyristor, so that it is controlled by electric signals to apply or interrupt a current. A single phase alternating current is taken out of two phases of the three phase AC power source 16 and is converted to a direct current after its voltage is decreased. The direct current is fed to the operation control device 14 which is connected to a backup battery 20.

Figure 2:
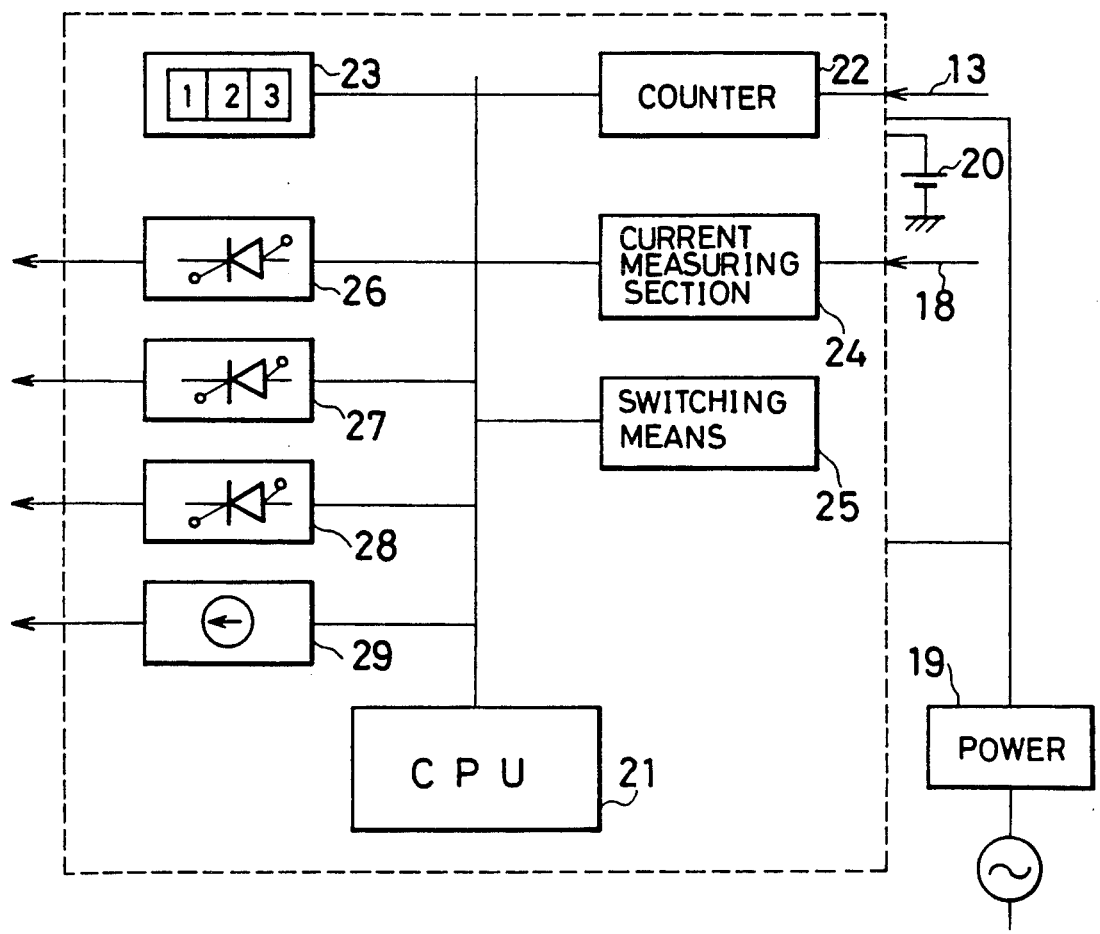
FIG. 2 is a block diagram of an operation control device in FIG. 1.

FIG. 2 illustrates one embodiment of the operation control device 14, which is a microcomputer including CPU 21 principally. The operation control device 14 comprises a counter 22 for counting a pulse of the output electric signal 13 from the incremental rotary encoder 12, a liquid crystal display 23 for displaying an opening value which is converted from the counting value of the counter 22, a current measuring section 24 for detecting existence of a current of the electric motor 1 by the output signal 18 from the current detector 17, if necessary, the measuring section measuring magnitude of the current to convert a digital value, and a switch 25 for inputting a desired initialization value or functional code.

The operation control device 14 comprises a torque control output section 26, a full-opening and complete-closing control output section 27, if necessary, an intermediate opening control output section 28 and an opening degree output section 29. The counter 22 and the display 23 have a power source which comprises the backup battery 20. The value of the counter 22 is fed to outside via the opening degree output section 29.

When the rotary encoder 12 is of absolute type, the counter 22 becomes unnecessary and, as the case may be, the backup battery 20 also becomes unnecessary. That is to say, the incremetal-type rotary encoder 12 and the counter 22 make the counting value kept in the backup battery 20 so as to fulfil the same function as an absolute-type rotary encoder. Accordingly, the counter 22 becomes unnecessary and, as the case may be, the backup battery 20 also becomes unnecessary.

Figure 3:
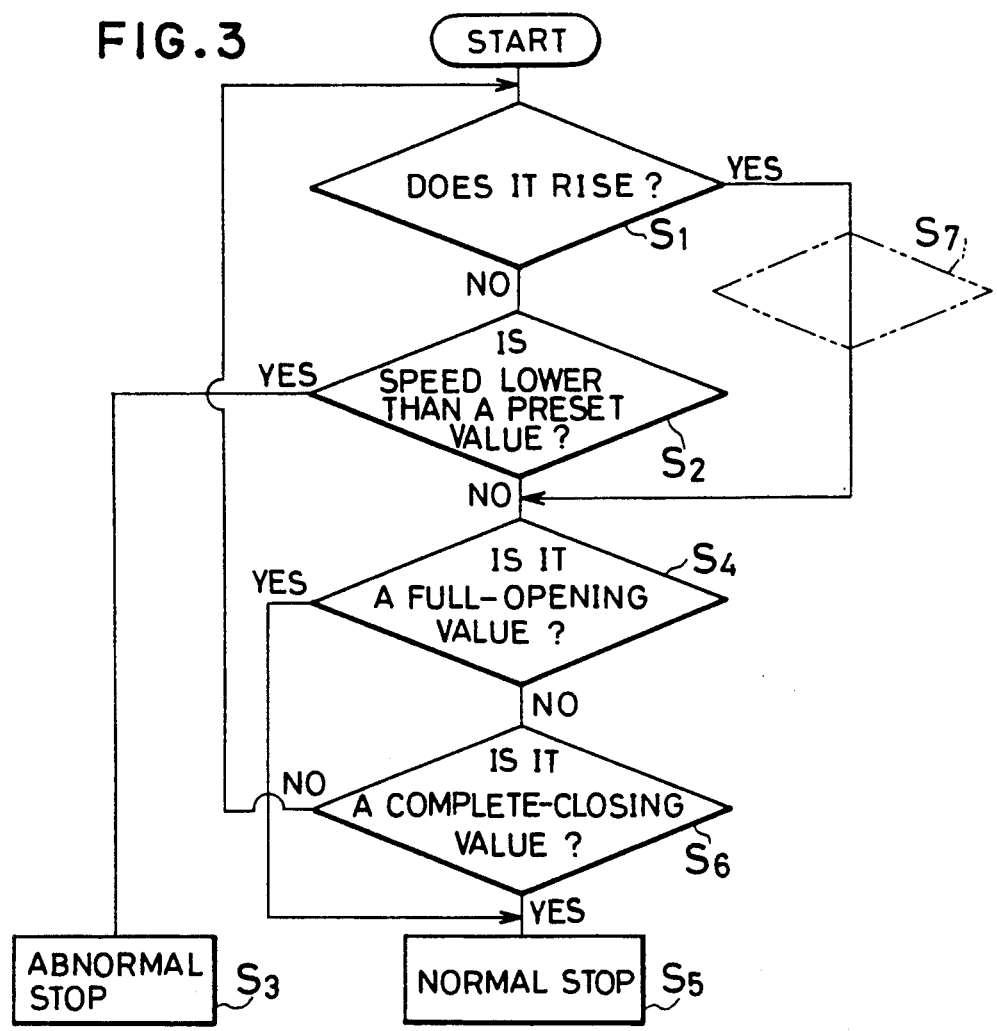
FIG. 3 is a flow chart of main control in the operation control device.

FIG. 3 illustrates one example of a flowchart for control of the operation control device 14 in FIG. 2. Opening or closing of driven material such as a valve is instructed and controlled by other control means. So, the power applying-interrupting means 15 starts applying a current. A drive current from the electric motor 1 is detected by the current detector 17. According to the drive current, CPU 21 detects via the current measuring section 24 that the electric motor 1 has been started, whereby the routine in the flowchart of FIG. 2 begins.

Rising of the electric motor 1 is identified by the step "$S_1$" and when rise time expires, it is identified in the step "$S_2$" whether or not the rotation speed of the main shaft 4 is lower than a preset speed.

The rotation speed of the main shaft 4 is detected as period of pulse which is fed from the rotary encoder 12 or as rate of change of the counting value at the counter 22. When the rotary encoder 12 is of absolute type, the rotation speed is detected with rate of change of input value. The rotation speed of the main shaft 4 decreases depending on magnitude of the load torque if the torque is larger than a normal value.

The step "$S_2$" is a routine for making control depending on magnitude of the load torque. If it is identified that the load torque is larger than a preset value in the step "$S_2$", it proceeds to a step "$S_3$" for stopping the electric motor 1 abnormally, in which an output signal genarates from the torque control output section 26 to make the power applying-interrupting means put to the interruption side forcedly.

If the speed is normal in the step "$S_2$", it proceeds to the step "$S_4$", in which it is identified whether or not the counting value of the counter 22 is a full opening value when the driven material is a valve. In the step "$S_4$", if the value of the counter 22 is equivalent to the full opening value, it proceeds to a step "$S_5$", which is a routine for stopping the electric motor 1 normally; otherwise, it proceeds to a step "S$_6$", In the step "S$_5$", an output signal generates from the full-opening and complete-closing control output section 27 to put the power applying-interrupting means 15 to interruption side normally, whereby the electric motor 1 stops.

The difference between forced interruption in the step "S$_3$" and normal interruption in the step "S$_5$" is whether or not current is readily applied again in the power applying-interrupting means 15. If it is a normal interruption, a current can be applied again.

However, depending on process for abnormal treatment, it is not necessary to provide difference on abnormal interruption. In this case, it is possible for the torque control output section 26 to be the same as the full-opening and complete-closing control output section 27 so that an interruption signal may be common with each other.

If the value of the counter 22 is not equivalent to the full-opening value in the step "S$_4$", it proceeds to a step "S$_6$", in which, if the value of the counter 22 is equivalent to the complete-closing value, it proceeds to the step "S$_5$" in which the electric motor 1 is normally stopped, while, if the value of the counter 22 is not equivalent to the complete-closing value, it comes back to the step "S$_1$" to form a loop which continues until the electric motor 1 stops.

If rise time of the electric motor 1 is identified in the step "S$_1$" so that it makes a detour around the step "S$_2$", it is possible to insert a step "S$_7$" which is a routine for detecting lowering of the rotation speed of the main shaft 4 on the way of rising. For example, sampling data obtained by sampling normal rising speed of the electric motor is stored in a memory. Comparing the present speed variation with normal rising speed variation which is read from the memory in the step "S$_7$", abnormality is detected from the difference. So, if abnormal speed lowering is identified, it proceeds to the step "S$_3$" in which the electric motor 1 is abnormally stopped.

Between the steps "S$_4$" and "S$_6$", if necessary, there is provided an intermediate-opening identification routine, which operates the intermediate opening degree control output section 28, when the value of the counter 22 is equivalent to desired intermediate value between the full-opening and complete-closing value, whereby the electric motor is normally stopped; otherwise, it proceeds to the step "S$_6$".

Figure 4:
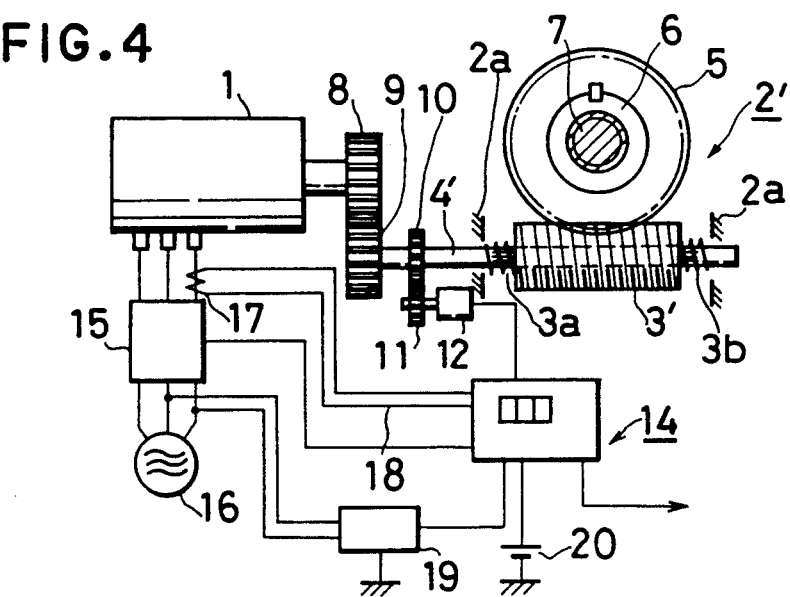
FIG. 4 is a schematic view of another embodiment of the electric actuator control apparatus.
Figure 5:
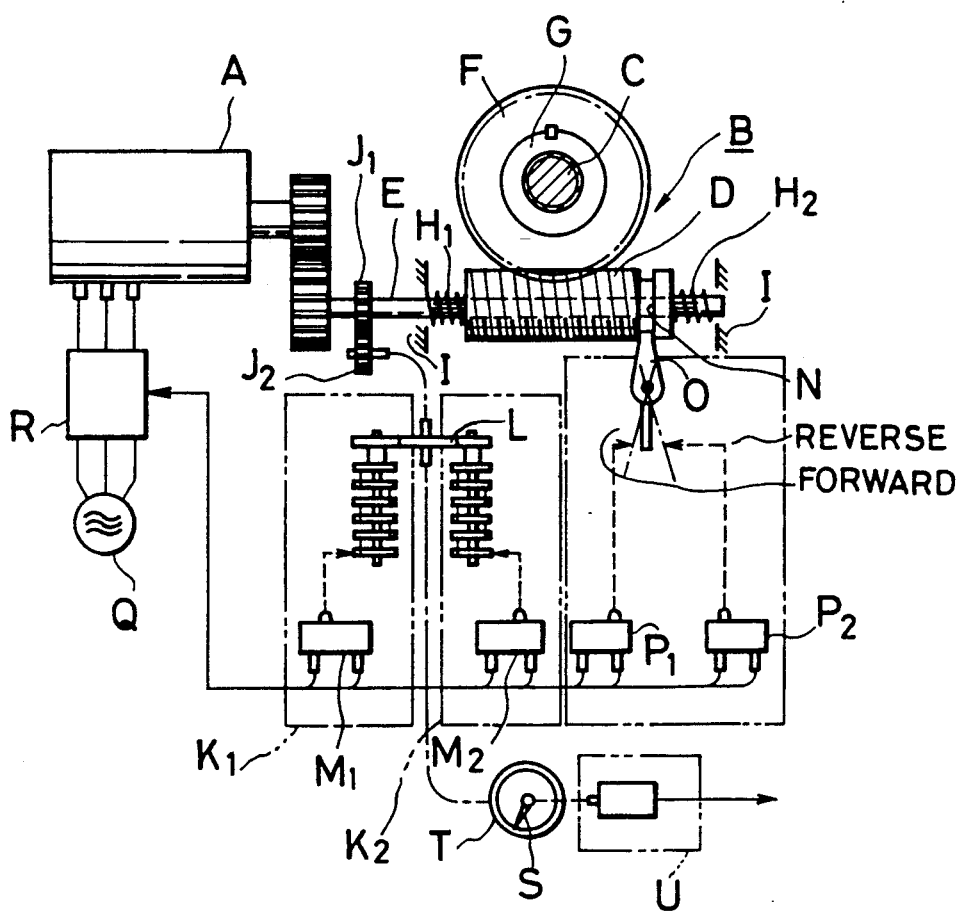
FIG. 5 is a schematic view of a known electric actuator control apparatus.

FIG. 4 illustrates another embodiment of an electric actuator according to the present invention. In reduction means 2', a worm 3' is connected in spline with a main shaft 4', and between the worm 3' and stationary sections 2a, compression springs 3a and 3b are provided respectively. The springs make buffer action when power is fed from the electric motor 1 to the load so as to prevent drastic torque increase on the load. The reduction means 2' which comprises the above buffer means makes speed change of the main shaft 4' slow so as to cause correct control in load torque.

When the driven material is a valve, a seat pressure may be necessary depending on type of the valve. Setting the seat pressure in desired value makes complete-closing point controlld.

According to the present invention, the number of structural parts is reduced, but the electric actuator can make control at the same extent by the prior art. The invention allows it easier to set an intermediate control point, to increase the number of the points and to adjust control points. Futher, there is electrically no contact point for control of operation and few frictional parts are worn, which makes it unnecessary to exchange parts for long-time maintenance and to adjust control points again.

While preferred embodiments of the present invention have been described, it is to be understood that various changes and modifications may be made without departing from the spirit or scope of the following claims.

What is claimed is:

1. A control apparatus in an electric actuator for actuating driven material requiring relatively large initial torque, with output form an electric motor via reduction means, the motor providing reduced torque with increase of rotation of the output of the motor, the apparatus comprising:

rotation amount detecting means to detect an input rotation amount of the reduction means digitally at an absolute level from a certain reference position;

load torque control means connected in electrical communication with the rotation amount detecting means for detecting load torque from rate of change of the detected input rotation amount and identifying magnitude of the detected load torque to control the electric motor;

operation position control means connected in electrical communication with the rotation amount detecting means for identifying the detected input rotation amount by measuring an operation position of said driven material at the absolute level of the input rotation amount of the reduction means and controlling the electric motor at operation points; and said rotation amount detecting means being one of an incremental rotary encoder and an absolute rotary encoder with a backup battery.

2. An apparatus as defined in claim 1 wherein the detected value of the rotation amount detecting means is displayed by a liquid crystal display.

3. An apparatus as defined in claim 1 wherein the detected value of the rotation amount detecting means is transferred to outside by signal feeding means.

4. An apparatus as defined in claim 1 wherein the load torque control means starts identification upon detection of a drive current from the electric motor.

5. An apparatus as defined in claim 1 wherein the operation position control means starts identification upon detection of a drive current from the electric motor.

6. An apparatus as defined in claim 1 wherein the load torque control means and the operation position control means starts identification upon detection of a drive current from the electric motor.

7. An apparatus as defined in claim 1 wherein the load torque control means and the operation position control means comprise a microcomputer with CPU.

8. An apparatus as defined in claim 1 wherein the reduction means comprises buffer means on the way of a rotation transmission mechanism.

* * * * *